Figure 1:
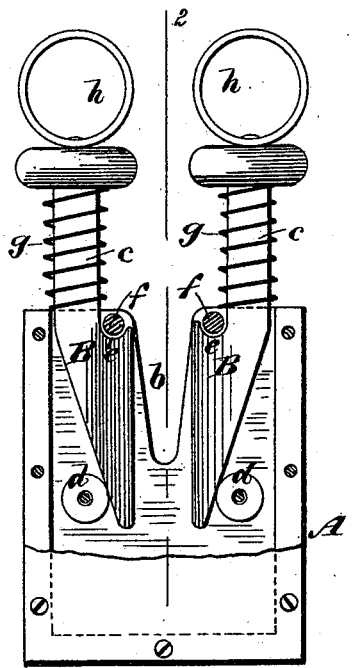

(No Model.)

G. E. HAWES.
FRUIT PICKER.

No. 497,573. Patented May 16, 1893.

WITNESSES:
F. McArdle.
C. Sedgwick

INVENTOR
G. E. Hawes
BY
Munn & Co
ATTORNEYS.

UNITED STATES PATENT OFFICE.

GEORGE E. HAWES, OF PALATKA, FLORIDA.

FRUIT-PICKER.

SPECIFICATION forming part of Letters Patent No. 497,573, dated May 16, 1893.

Application filed August 1, 1892. Serial No. 441,818. (No model.)

*To all whom it may concern:*

Be it known that I, GEORGE E. HAWES, of Palatka, in the county of Putnam and State of Florida, have invented a new and useful Improvement in Fruit-Pickers, of which the following is a full, clear, and exact description.

This invention relates to devices for clipping the stems of fruit while on the tree, as for instance in picking or gathering oranges and other fruits for market, in which it is deemed necessary or advisable to sever with a cutting instrument the stem holding the fruit, and so avoid that injury to the rind or outside pellicle which so often occurs by either plucking or breaking the stem, that has the tendency of causing the fruit to rot easier or more rapidly.

My invention consists of a hand device or implement of novel construction for this purpose, substantially as hereinafter described and more particularly pointed out in the claims, and the object of the invention is to produce a simple and efficient contrivance for this purpose, whereby the person picking the fruit can conveniently hold and operate the stem cutting device and hold the fruit from falling to injure itself, by one and the same hand, while the other hand is left free for other uses.

With many or most other fruit stem clippers it is necessary to get near enough to the fruit on the tree to touch it with both hands in order that one hand may hold it to keep it from falling and being injured or ruined, while the other hand is used for cutting the stem of the fruit. Under such a condition it is necessary that the fruit gatherer's body should have so firm a footing when perched upon a bough, ladder or aught else, that he requires neither hand to hold him in position. If he uses a ladder or other means of support, it will be frequently necessary to shift the position of the same and to make a descent and ascent each time, which involve considerable labor and loss of time, whereas with the implement to which my invention relates, a person can hold onto the limb of a tree with one hand and reach farther to gather the fruit, and can bend down and hold a bough full of fruit until he gathers it all, before letting the bough go. Furthermore, he can stand in numerous positions on a tree by having one hand free to hold on with, which would be otherwise impossible, and he can gather more fruit in a day than by the use of a stem clipper of different character.

There is no analogy between my improved implement and those fruit pickers placed upon the end of a pole and made to gather and hold the fruit by pulling on a string or rod operated from the ground, as mine is a direct hand device of different character and differently operated.

Reference is to be had to the accompanying drawings forming a part of this specification, in which similar letters of reference indicate corresponding parts in both the figures.

Figure 2:
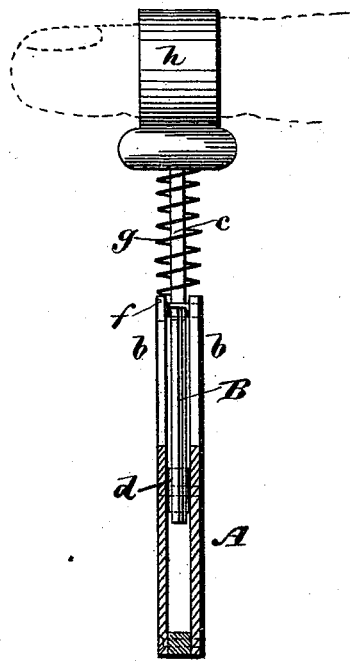

Figure 1 represents a partly broken side view of a fruit clipper or picker embodying my invention; and Fig. 2 a sectional view upon the line 2—2 in Fig. 1.

My clipping instrument embraces a case A, which may be mainly made of two pieces of sheet metal fastened together at their longitudinal edges and one end, with space enough between them to allow of the passage of one or two cutters or thin blades of steel B, preferably two opposite working cutters, through the end of the case which is left open. Through this same end and through both side plates of the case, a slot or open recess $b$, is cut large enough to admit the stem of the fruit to be severed. The steel plates B, one of which might be stationary but both of which are here shown operative, have cutting edges opposite each other and lying between the side plates of the case on each side of the open slot $b$, and the shanks or ends $c$ of the two working cutters project through the open end of the case. Said blades are made inclined on their back edges so that when their projecting shanks $c$ are pushed down between the plates of the case, the cutting edges of the blades sweep across the open slot $b$ and cut with a drawing cut anything lying therein. Two rollers $d$, $d$, in the case and against which the inclined backs of the cutting blades B, B bear, serve to laterally direct said blades across the slot $b$ as the blades are moved or forced inward. The shanks $c$ of the blades are narrower than the portions of the latter they project from, thereby forming shoulders which are constructed with hook-shaped recesses as at $e$, and strike against or receive within them screws, studs or stops $f$ near the mouth of the slot $b$, to prevent the blades from being pulled out of the case in the working of the implement and hold them in position, but which screws or stops when removed permit of the blades being taken out and sharpened. A coiled spring $g$ around each shank $c$ of either cutter, keeps each blade or cutter up against the screw or stop $f$ till pressed down or in by the fingers against the tension of the springs $g$, when the rollers $d$, $d$ operate to laterally sweep the cutting edges of the blades across the slot $b$ to make the cut. The stems $c$ of the blades are suitably capped and may be provided with finger loops $h$, for application of the fingers to press the blades inward.

When using the implement, it is secured to the first and second finger of the one hand by ligature or by glove, or otherwise held in the palm of the hand. The user of the clipper then passes his hand holding the implement over the fruit, letting the stem of the fruit pass between his first and second finger and go into the slot $b$, when by flexing the last joints of those fingers he presses the cutting blades down between the side plates of the case and the cutting edges sever the stem of the fruit, he at the same time holding the fruit with the thumb and third and fourth fingers of the same hand to keep it from falling and being injured, and having his other hand free for other uses as desired.

When only one blade is made movable then the operator only uses one finger to force inward said blade, and holds the fruit with his thumb and three fingers.

Having thus fully described my invention, I claim as new and desire to secure by Letters Patent—

1. As a new article of manufacture, a fruit picker adapted to be held within the hand of the operator, and consisting of an open ended case having a slot down through its sides at its open end to receive the stem of the fruit within it,—and one or more finger-operated cutting blades fitted to work down within said case and to sweep laterally or transversely across said slot,—and a spring controlling the movement of the sliding blade, substantially as specified.

2. In a hand fruit picker or stem clipper, the combination of the case A, having an open end and a slot or recess $b$, through its sides at said end, the longitudinally sliding and transversely moving cutting blades B, provided with shanks $c$, projecting outward and adapted to be worked inward by the pressure of the fingers, springs operating to force said blades and their shanks outward again, screws or stops engaging with said blades when forced outward, and guides or rollers $d$ operating to direct the blades when forced inward transversely of the slot in the case, substantially as specified.

GEORGE E. HAWES.

Witnesses:
LEON J. CANOVA,
EDWARD S. CULL.